US008862503B2

(12) United States Patent
Hayton et al.

(10) Patent No.: US 8,862,503 B2
(45) Date of Patent: Oct. 14, 2014

(54) METHOD OF TRACKING SOFTWARE APPLICATION INTERNET DOWNLOADS

(75) Inventors: Paul Michael Hayton, Oxfordshire (GB); Philip Stephen Jones, Suffolk (GB)

(73) Assignee: AD-X Limited, Suffolk (GB)

( * ) Notice: Subject to any disclaimer, the term of this patent is extended or adjusted under 35 U.S.C. 154(b) by 0 days.

(21) Appl. No.: 13/287,630

(22) Filed: Nov. 2, 2011

(65) Prior Publication Data

US 2012/0278186 A1     Nov. 1, 2012

(30) Foreign Application Priority Data

Apr. 28, 2011    (GB) .................................. 1107275.8

(51) Int. Cl.
*G06Q 30/00*     (2012.01)
*G06F 21/10*     (2013.01)
*G06Q 30/02*     (2012.01)

(52) U.S. Cl.
CPC ........ *G06Q 30/0277* (2013.01); *G06Q 30/0246* (2013.01); *Y10S 705/901* (2013.01); *Y10S 705/908* (2013.01)
USPC ..................... 705/14.73; 705/14.45; 705/901; 705/908

(58) Field of Classification Search
USPC ....................................................... 705/14.73
See application file for complete search history.

(56) References Cited

U.S. PATENT DOCUMENTS

| | | | |
|---|---|---|---|
| 5,007,649 A * | 4/1991 | Richardson ..................... | 463/25 |
| 6,067,416 A | 5/2000 | Fraser | |
| 6,081,533 A * | 6/2000 | Laubach et al. .............. | 370/421 |
| 6,636,863 B1 * | 10/2003 | Friesen ................................. | 1/1 |
| 7,058,699 B1 | 6/2006 | Chiou et al. | |
| 7,263,526 B1 * | 8/2007 | Busey et al. .......................... | 1/1 |
| 7,516,104 B1 | 4/2009 | Scardino | |
| 2007/0150606 A1 | 6/2007 | Flinchem et al. | |
| 2007/0174490 A1 | 7/2007 | Choi et al. | |
| 2008/0086559 A1 | 4/2008 | Davis et al. | |

FOREIGN PATENT DOCUMENTS

| | | |
|---|---|---|
| EP | 2323091 A1 | 5/2011 |
| WO | WO-2009052531 A1 | 4/2009 |
| WO | WO-2010088764 A1 | 8/2010 |

OTHER PUBLICATIONS

Search Report regarding Great Britain Patent Application No. 1107275.8, dated Aug. 19, 2011.
Extended European Search Report regarding Application No. 11187534.0-2221, dated Apr. 25, 2012.

(Continued)

*Primary Examiner* — John G Weiss
*Assistant Examiner* — Scott C Anderson
(74) *Attorney, Agent, or Firm* — Harness, Dickey & Pierce, P.L.C.

(57) ABSTRACT

A method of tracking software application downloads over the internet in which clicking on a web advertisement for a software application causes a user's device web browser to link to a tracking server which creates a unique identifier which is stored by the user's device browser, and also on the tracking server together with an indication of the web page including the advertisement. The user's device web browser then downloads the desired software application which includes executable code which, upon first execution, suspends the downloaded application and starts the browser, directing it to the tracking server and sending the unique identifier to the tracking server together with identification of the device and downloaded software application. The tracking server then uses the unique identifier to correlate the information on the downloaded application with the information originally stored at the time of clicking on the web advertisement.

15 Claims, 5 Drawing Sheets

(56) References Cited

OTHER PUBLICATIONS

D4 XP055096201—"Mobile Advertising Architecture Open Mobile Alliance OMA-AD-Mobile_Advertising-V1_0-20100126-C", Jan. 2010.
D5 XP055096203—"Mobile Advertising Requirements Open Mobile Alliance OMA-RD-Mobile Advertising-V1_0-20100126-C", Jan. 2010.
D6 XP055096204—"MobAd Technical Specification-Core Specification Open Mobile Alliance OMA-TS-MobAd_Core-V1_0-20100408-C", Apr. 2010.
EP Examination Report regarding Application No. 11 187 534.0 dated Jan. 21, 2013.
EP Examination Report regarding Application No. 11 187 534.0 dated Jan. 20, 2014.

* cited by examiner

FIGURE 2

METHOD OF TRACKING SOFTWARE APPLICATION INTERNET DOWNLOADS

The present invention relates to a method and system for tracking downloads of software applications over the interne, and in particular to correlating such downloads with prior visits to web advertisements for the software applications.

Businesses who make products available over the internet and advertisers who advertise on the internet need to be able to track and analyse the effectiveness of their activities. In particular advertisers need to be able to track and analyse the effectiveness of advertising placed on websites and in applications with regard to their success in achieving a desired action or set of actions from a user, such as clicking on the advertisement or purchasing the advertised product. The analysis of advertising spend in terms of its effectiveness and return on investment are of critical importance to today's advertisers and their agents. It is of great advantage to understand the user actions achieved by a given advertising activity and to break down the effectiveness in terms of the desired outcome (e.g. download and use of a software application, either in itself or to make a further purchase) with the advertising activity that spurred this outcome. Advertisers may run a variety of different advertising campaigns simultaneously each with the same purpose and so the ability to determine which campaign resulted in which user activity is extremely useful. Information such as the time of day that an advertisement was viewed and the type of device it was viewed upon are all of increasing importance in analysing the effectiveness of advertising spend and directing future spend.

Current methods for tracking users' web activities include, for example:
(1) a form of cookie-based tracking in which information is stored on a user's device and can be transmitted to a tracking server as part of an image request directed to that server as a result of a one by one pixel image request embedded in a downloaded webpage; or
(2) a server-side tracking method in which a unique identifier is passed along with the user's viewing activity, e.g. as a parameter string appended to a URL. However these systems are limited in that they are not effective in matching up the web activity of a user before downloading a software application with the actual downloading and subsequent execution of that software application. Thus with current systems although a user's web activity in, for example, clicking on an advertisement for a software application could be monitored, it is not possible to determine whether the user then on visiting a software application web store actually downloads and subsequently executes the application. This is because user devices are inherently designed to separate the activities and related local storage in the device between that part of the device used for browsing web pages and that part used for running applications. Thus a cookie or other similar variable written to the device during operation of a web browser cannot be read by other software applications. Further the inherent unique hardware device identifier of a user's device (e.g. the UDID i.e Unique Device IDentifier, or similar unique device identifier or indeed any identifier unique to an application resident on a given device) which is usually available to applications is not usually available to the browser. This means that activities during browsing cannot necessarily be correlated with downloading and activation of a software application. Furthermore server-side tracking cannot be performed because the parameter strings on which it relies cannot be carried through the activity of downloading an application from a software application store, which typically is controlled by another party.

There is therefore a need to be able to correlate in a tracking server the web activity of a user clicking on an advertisement with a user's subsequent downloading of the advertised software application and the user's activation of that application (whether for its own functionality or to make a further purchase). Furthermore, it would be useful to be able to track subsequent actions performed on the user's device using the downloaded application, for example further purchases of goods, sign-ups to a service, number of uses of the application and so on and relate them back to the advertisement which prompted the user to download the application.

One aspect of the invention provides a method of tracking software application downloads over the interne from an application server to a user's device in response to user's selection on the user's device of an advertisement for the software application, the method comprising the steps of: providing, for delivery to the user's device, a clickable advertisement for the software application, the clickable advertisement being such that clicking thereon causes the user's device web browser to link to a tracking server; the tracking server creating a data set comprising at least one of a unique identifier and identification of the advertisement, the data set being stored on the tracking server and the unique identifier or identification of the advertisement being transmitted to and stored on the user's device by the user's device browser, the tracking server further redirecting the user's device web browser to the application server from which the user can download the software application to the user's device; providing in the downloadable software application executable code which, upon download and activation of the software application by the user's device obtains a unique device identifier from the device, an identifier of the downloaded software application, and the unique identifier or identification of the advertisement created by the tracking server and transmits them as application download information to the tracking server; the tracking server using the unique identifier or identification of the advertisement to correlate the created data set and the received application download information. The unique identifier or identification of the advertisement form an ID dataset which can be stored by the device and/or server and passed from one to the other and which form a link for correlating web advert activity with application download.

Another aspect of the present invention provides a method of tracking software application downloads over the internet from an application server to a user's device in response to user's selection on the user's device of an advertisement for the software application, the method comprising the steps of: providing, for delivery to the user's device, a clickable advertisement for the software application, the clickable advertisement being such that clicking thereon causes the user's device web browser to link to a tracking server; the tracking server creating an ID dataset comprising at least one of a unique identifier and identification of the advertisement, the ID dataset being stored on the user's device by the user's device browser, the tracking server further redirecting the user's device web browser to the application server from which the user can download the software application to the user's device; providing in the downloadable software application executable code which, upon download and activation of the software application by the user's device starts the user's device web browser; and transmitting the ID dataset as application download information to the tracking server.

Thus with the invention the initial selection activity by the user is noted on the user's device in an ID dataset which can comprise an identifier unique to that click or representing a class of clicks, e.g. identification of the advertisement. This is then sent to the tracking server as application download information when the advertised software application has been downloaded. Thus the tracking server can correlate the web advert activity with the actual application download.

The ID dataset may be stored on the user's device as a cookie or a client-side database item or both. Such a cookie or client-side database item can be stored by the user's device web browser. The same ID dataset can also be stored on the tracking server as a web advert activity record.

Preferably the tracking server delivers browser-executable code to the user's device which causes the browser to resume the downloaded software application.

In one embodiment the executable code provided in the downloadable software application suspends the downloaded software application and activates the user's device web browser to link to the tracking server and to pass the application download information to the tracking server.

Alternatively or in addition the executable code provided in the downloadable software application suspends the downloaded software application, activates the user's device web browser to link to the tracking server, whereupon the tracking server returns browser-executable code to the user's device for execution by the user's device browser, the browser-executable code causing the browser to obtain the ID dataset, to resume the downloaded software application and to pass the ID dataset to the downloaded software application. In this case the downloaded software application has the ID dataset and it can pass it to the tracking server together with information that is available to the application (but not to the browser) such as hardware/firmware identifiers or application identifiers, or identifiers formed from a combination of hardware/firmware identifiers and application identifiers. To this end the downloaded software application can further include executable code which causes the user's device/software application to pass the ID dataset to the tracking server as application download information.

The ID dataset preferably comprises either a unique identifier (e.g. an assigned number) of the click or an identifier that the click is on one of a class of advertisements without distinguishing individual clicks within the class. It preferably also comprises at least one of: a unique hardware/firmware device identifier obtained from the user's device, an identifier of the downloadable (target) software application, or a combination of the two, the date and time of the user selection of the advertisement, the type of the user's device, identification of the delivery of the advertisement to the user's device, and the IP address used by the user's device when the selection of the advertisement was made. The identification of the delivery of the advertisement to the user's device can comprise at least one of the identity of a webpage or application including the advertisement, the identity of a publisher of the advertisement, and the name of the advertising campaign.

The advertisement can be a web advertisement for inclusion in a webpage.

In an alternative embodiment of the invention the ID dataset can be created on the user's device under control of the executable code in the advertisement. The process is otherwise be as described above. This avoids the need to contact the tracking server before redirection to the application download server. Thus this aspect of the invention provides a method of tracking software application downloads over the interne from an application server to a user's device in response to user's selection on the user's device of an advertisement for the software application, the method comprising the steps of: providing, for delivery to the user's device, a clickable advertisement for the software application, the clickable advertisement including browser-executable code; the browser executable code causing the user's device to create an ID dataset comprising at least one of a unique identifier and identification of the advertisement, the ID dataset being stored on the user's device by the user's device browser, the clickable advertisement further redirecting the user's device web browser to the application server from which the user can download the software application to the user's device; providing in the downloadable software application executable code which, upon download and activation of the software application by the user's device starts the user's device web browser; and transmitting the ID dataset as application download information to the tracking server.

Where the ID dataset includes an identifier which is unique to a particular click on an advert it can be used to correlate the web advert activity and application download information together as this identifies the specific user selection action that led to the download. However if the advertiser is interested only more generally in which advertisement led to the activity, it is possible to include in the ID dataset only an advertisement identifier and to use this to correlate the application download information.

The invention allows the required information to be assembled at the tracking server despite the fact that all of the required information is not available to either the user's device browser or to the downloaded software application.

The invention will be further described by way of example with reference to the accompanying drawings in which:—

Figure 1:
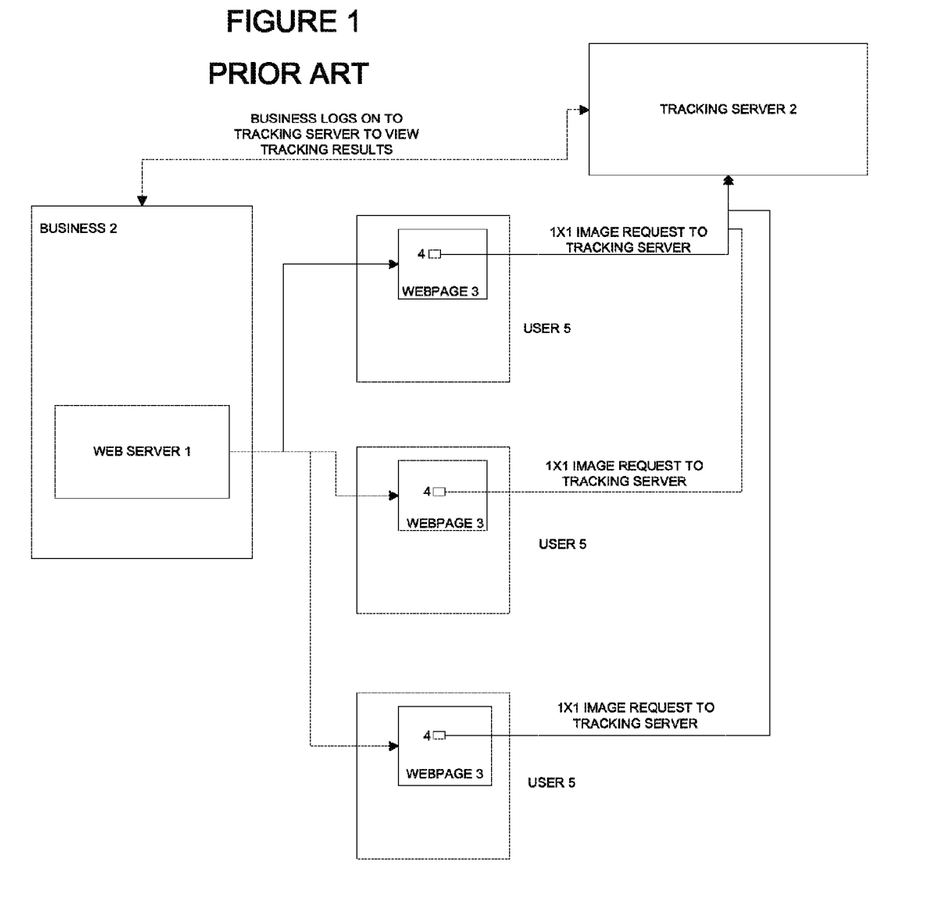
FIG. 1 schematically illustrates a prior art tracking pixel based way of monitoring a user's web activity.

FIG. 1 illustrates a prior art web activity monitoring system of the type which uses a "web bug" or "tracking pixel". As illustrated a web server 1 can supply web pages 3 to users' browsers 5. A web page which is to be monitored includes a one by one pixel image request 4 which causes the user's web browser 5 to request an image from a tracking server 2. The image request includes the desired information about the user and is stored by the server 2 for access by the business 2 which originally provided the web pages. Such information can include the IP address of the user, which web page was being viewed and some web browsing history. Typically businesses which provide web pages pay a subscription to web activity tracking companies who provide them with the required code to include in their web pages and which allow them to log on to the tracking server 2 to monitor the stored information. However, as discussed above, if the user leaves the downloaded web page 3 and visits a site from which software applications can be downloaded, there is no way in the prior art of correlating the user's web activity with the subsequent use of the downloaded application.

Figure 2:
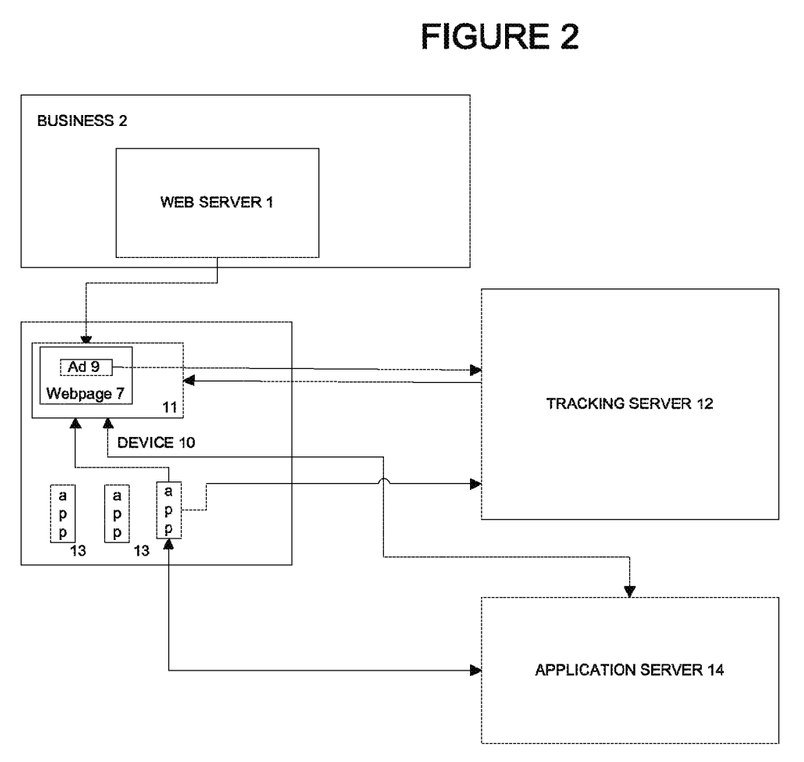
FIG. 2 schematically illustrates an embodiment of the present invention.
Figure 3:
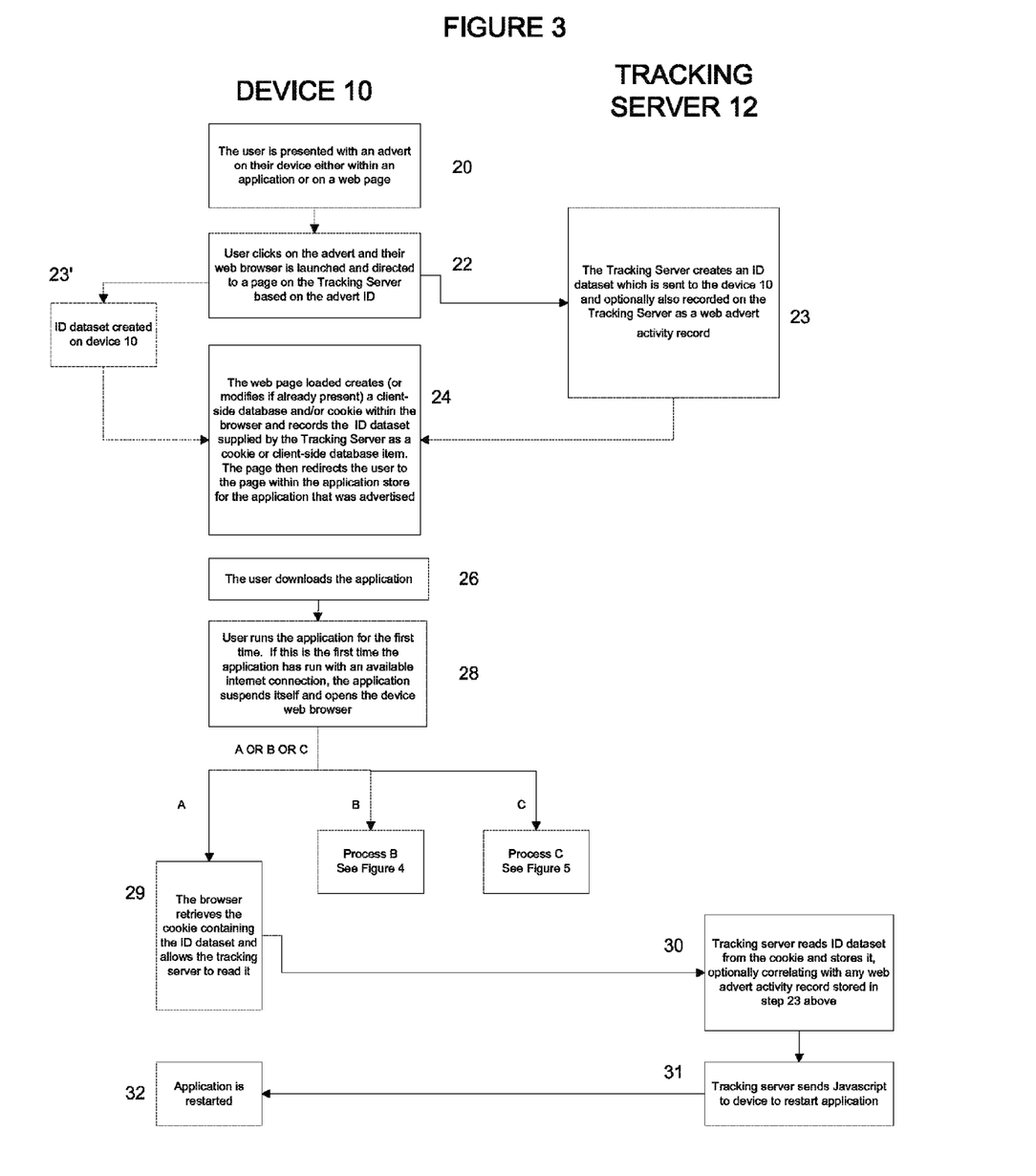
FIG. 3 is a flow diagram illustrating a web activity and download monitoring method in accordance with an embodiment of the present invention.
Figure 4:
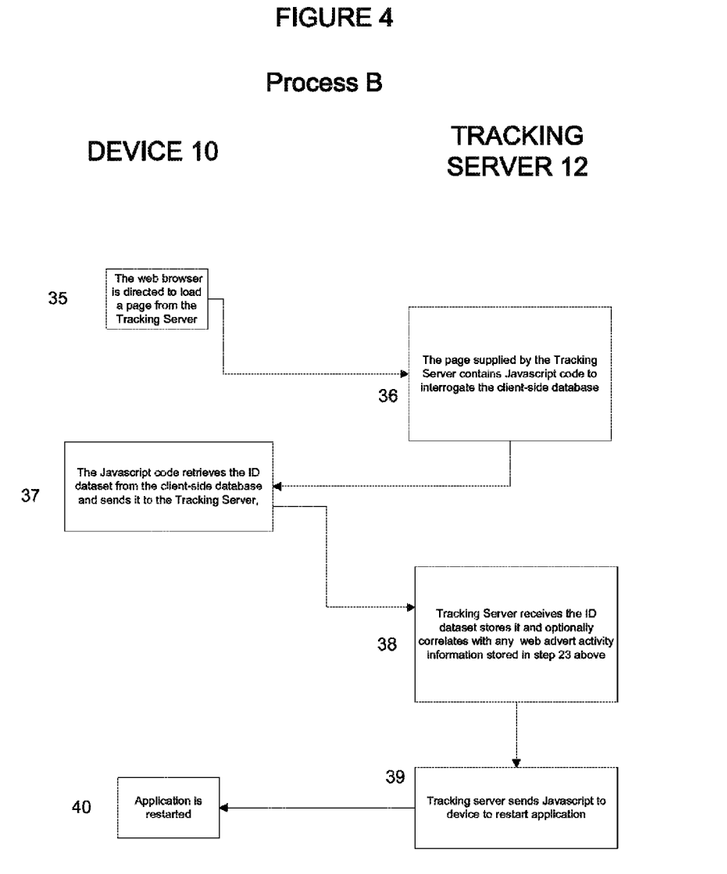
FIG. 4 is a flow diagram illustrating further steps in such a method in accordance with an alternative embodiment of the present invention.

FIGS. 2, 3 and 4 illustrate schematically an embodiment of the present invention. The left hand side of the flow diagrams indicate the actions of the user's device 10, which is typically a mobile device such as an iPhone or tablet device such as an iPad and has a browser 11 on which web pages 7 can be viewed, and several software applications 13 (apps). The right hand side of the flow diagrams indicate the activity on the side of the tracking server 12.

In step 20 the user of the device 10 is presented with a link or image 9 (e.g. a banner advertisement) whilst using the browser 11 on the device 10 or a software application 13 resident on the device 10. In step 22 the user clicks on the advertisement and this directs the user's device web browser 11 (launching it first if not already launched) to a page on the tracking server 12 based on the advertisement identifier. The tracking server 12 executes a redirect which forwards the user's device browser 11 to a desired destination point on the interne (for example a software application server 14 (e.g. an "app store") where the software application referred to by the advertisement 9 is available for download). The tracking server 12 also generates in step 23 an ID dataset which in step 24 is placed on to the user's device browser 11 as a cookie and/or client-side database item, and which is optionally also stored in the tracking server 12 as a web advert activity record. The ID dataset can comprise a unique identifier of the particular click—e.g. an assigned number, together with at least one of: an identifier (e.g. name) of the advertised software application, the time of day and date (server time), the device type (which can be obtained from the UA (User Agent) header, the referring webpage (i.e. last viewed web page), the IP address which the user's device is connecting through, the identification of the software application being advertised and the publisher identification. Alternatively it can simply comprise an identifier that the click is one of a class of clicks—e.g. based on the type or class of advertisement or source of the advertisement, without distinguishing individual clicks within that class, that class identifier can be stored alone or with any of the other information listed above.

Although in this embodiment the ID dataset is created by the tracking server 12 it is possible for it to be created on the device 10 as a client side database item under the control of browser-executable code (e.g. Javascript) embedded in the webpage, application or advertisement, or stored on the device as a cookie, which would mean that contact with the tracking server as step 23 is not then required—step 23 being carried out in the device 10 as illustrated by dotted box 23' in FIG. 3.

Figure 5:
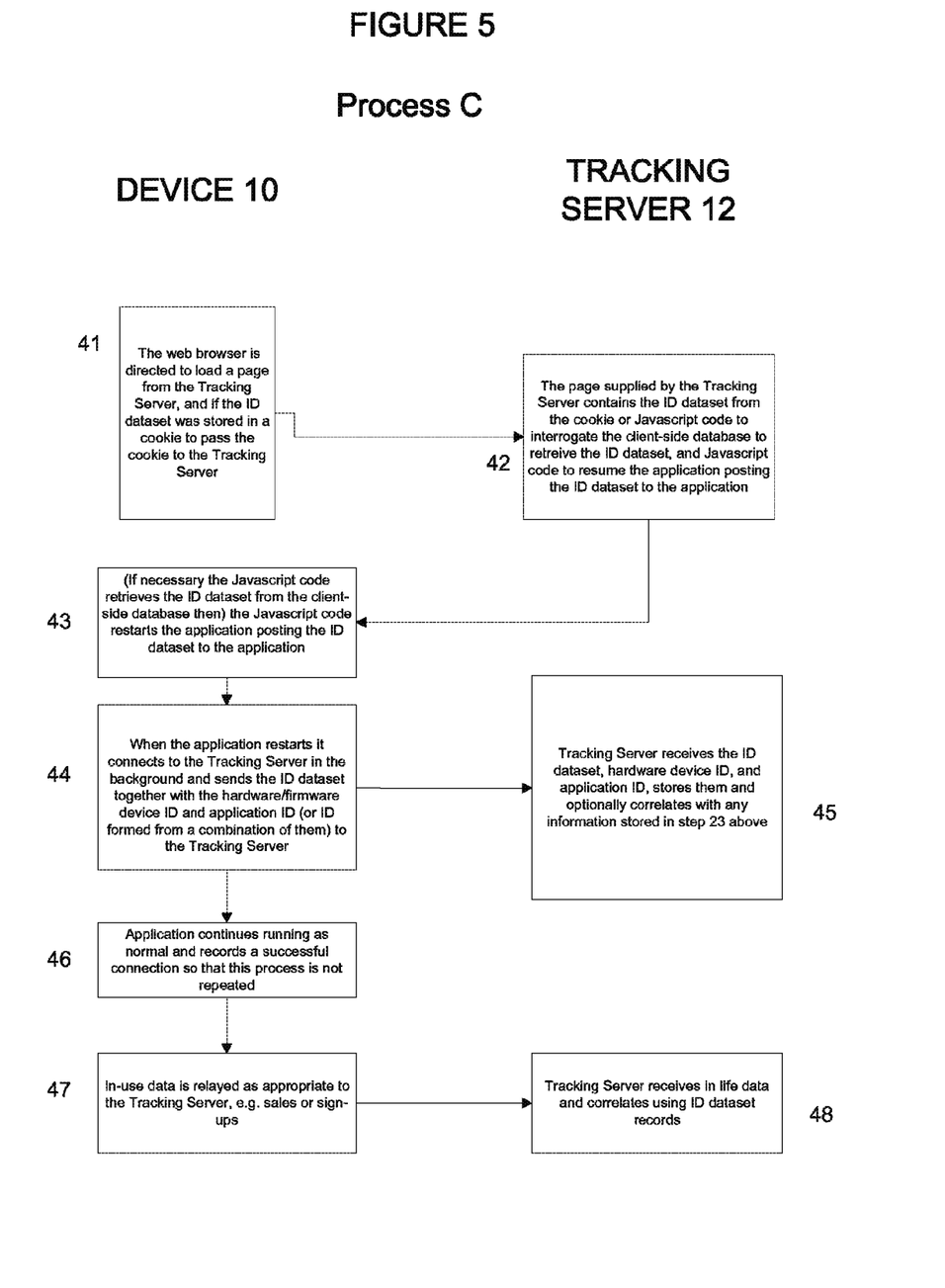
FIG. 5 is a flow diagram illustrating further steps in such a method in accordance with another alternative embodiment of the present invention.

In step 26 the user has, in this instance (either as a result of the redirect to the application server 14 or possibly some time later), decided to download the advertised software application to his device 10 from the application server (e.g. app store) 14. In accordance with the invention the software application includes a piece of executable code which activates on first start-up of the software application, and optionally on each successive start-up until being given the command to cease by the tracking server 12 (which can be either as a command or simply by having obtained a successful connection to the server). This piece of executable code operates in step 28 to cause the downloaded software application to suspend itself and to activate the user's device web browser 11. There are then several possible process flows as illustrated in FIGS. 3, 4 and 5. Processes A and B the use of the device browser 11 to supply the ID dataset to the tracking server 12. Process C represents this being done by the downloaded application itself. Process C may be combined with A or B and this can be advantageous as information is available to the application which may not be available to the browser 11.

In process A containing steps 29 to 32 the tracking server 12 retrieves the ID dataset stored as a cookie on the device 10. In step 30 the tracking server 12 stores the application download information from the ID dataset and can optionally correlate it with any information (e.g. web advert activity record) stored in step 23. In step 31 the tracking server sends a web page containing browser-executable code such as Javascript to the device 10, which on execution in the device 10 in step 32 restarts the downloaded application.

Depending on the amount of information stored in the ID dataset the tracking server 12 at least knows that a click on a particular advertisement has led to a download of the software application. The more information that was stored in the ID dataset (either on the device 10 or on the server 12 or both) the more detail the tracking server 12 has about the advertisement and user's device.

The alternative process B illustrated in FIG. 4 shows a similar process for the case that the ID dataset was stored as a client-side database item. In step 35 the user's device web browser 11 is directed by the executable code in the downloaded application to a predefined URL (Uniform Resource Locator) on the tracking server 12. In step 36 the tracking server 12 then creates a web page including a piece of browser-executable code such as Javascript which is passed back to the user's device web browser 11 and in step 37 causes the user's device web browser 11 to query the client side database on the device 10 for the presence of an ID dataset associated with the downloaded software application and originally stored on the device 10 in step 24. The user's device web browser 11 can then send the ID dataset to the tracking server 12 as application download information confirming the user's download of the application. In step 38 the tracking server 12 stores the ID dataset, optionally correlating it with any information stored on the tracking server in step 23 (the web advert activity record). Then in step 39 the tracking server 12 sends to the device 10 a web page containing browser executable code which causes the downloaded software application to resume in step 40.

FIG. 5 illustrates the flow of process C. This is based on the ID dataset being passed by the user's device web browser 11 to the downloaded software application (e.g. using the URL scheme of the device 10 registered when the application was built) and the application then storing this information and transmitting it to the tracking server 12. This can happen instead of process A or B or in addition to them.

As illustrated in FIG. 5 in step 41 the browser that was started in step 28 is directed to fetch a web page from the tracking server 12 in step 42. If the ID dataset was stored as a cookie it can be retrieved by the tracking server at this stage. The web page contains browser-executable code and either the ID dataset extracted from the cookie or code which in step 43 causes the browser to retrieve the ID dataset from the client-side database on the device 10, and then, in step 43, resumes the downloaded software application posting the ID dataset to the application. The ID dataset is stored by the application and then transmitted to the tracking server 12 in step 44. The application can also send the inbuilt hardware/firmware identifier of the user's device 10 (such as the UDID—Unique Device IDentifier) and an application identifier (or an identifier resulting from a combination of the two). In step 45 the tracking server 12 receives and stores this as application download information. If the tracking server 12 stored an ID dataset as a web advert activity record in step 23 it can correlate the received application download information with that web advert activity record.

In step 46 the downloaded software application continues running as normal and can record its successful connection to the tracking server 12 so as not to repeat browser launch (28) on subsequent uses of the downloaded application. However in step 47 it is possible to provide for further in-life activities performed within the application, such as online purchases of goods or registrations, to be recorded and sent to the tracking server for reference in step 48 to the original web advert activity record created in step 23 and the application download information stored in step 30, 38 or 45.

Therefore as an outcome of the process the tracking server 12 includes a record which contains at least the fact that the particular advertisement clicked-on in step 20 led to an application download. But more preferably by storing more information in the ID dataset as mentioned above it can include a record which contains:—

- The unique hardware identifier of the user's device, as embedded in the device by the device manufacturer (if available to downloaded applications);
- The type of device (e.g. i-phone);
- The origin of the original click on the advertisement—namely the organisation which displayed the advertisement, the version of the advertisement and any other details relating to the particular advertising campaign;
- The time and date of the click on the advertisement;
- The time and date of the first internet-connected use of the downloaded software application;
- The IP address of the device 10 when the advertisement was originally clicked upon and when the software application was originally used (these can indicate the country in which the device was);
- Any in-life usage data for the application, such as sales performed from the application or sign-up to a service, etc.

Example Code:

The following example code and set-up instructions are included for the purposes of clarity. This instruction is designed to clarify the process performed on the device to relate the activities performed by the device in using the resident web browser with the downloaded application.

Code and Instructions for iPhone, iPad, iPod.

1. The following function is executed when the Application is first started

```
- (BOOL)getReferral
{
    NSString *appname = [[[NSBundle mainBundle] infoDictionary] objectForKey:@"CFBundleIdentifier"];
    NSURL *url = [NSURL URLWithString:[[NSString alloc] initWithFormat:@"http://Comg.ad-x.co.uk/atrk/checkcsd.php?tag=ComgXXXX&appid=%@",appname]];
    if ([self connectedToNetwork])
    {
        NSString *documentsDirectory =
[NSSearchPathForDirectoriesInDomains(NSDocumentDirectory,
                                    NSUserDomainMask, YES)
objectAtIndex:0];
        NSString *deviceKeyPath = [documentsDirectory stringByAppendingPathComponent:@"DeviceKeyFound"];
        NSFileManager *fileManager = [NSFileManager defaultManager];
        if(![fileManager fileExistsAtPath:deviceKeyPath]) {
            if (![[UIApplication sharedApplication] openURL:url])
                NSLog(@"%@%@",@"Failed to open url:",[url description]);
            return TRUE;
        }
        else return FALSE;
    }
    return TRUE;
}
```

2. The following function is executed by the device when the browser resumes the app.

```
- (BOOL)application:(UIApplication *)application
handleOpenURL:(NSURL *)url
{
    NSString *documentsDirectory =
```

-continued

```
[NSSearchPathForDirectoriesInDomains(NSDocumentDirectory,
                                    NSUserDomainMask, YES) objectAtIndex:0];
    NSString *deviceKeyPath = [documentsDirectory
stringByAppendingPathComponent:@"DeviceKeyFound"];
    if (!url) { return NO; }
NSString *URLString = [url absoluteString];
// Save the information to UserDefaults.
[[NSUserDefaults standardUserDefaults] setObject:URLString
forKey:@"url"];
[[NSUserDefaults standardUserDefaults] synchronize];
// Create a marker file to prevent us doing this each time.
    NSFileManager *fileManager = [NSFileManager defaultManager];
    [fileManager createFileAtPath:deviceKeyPath contents:nil
attributes:nil];// successful report, mark it as such
    NSLog(@"Got the URL as %@",URLString);
    [self performSelectorInBackground:@selector(reportAppOpenToComg)
withObject:nil];
    return YES;
}
```

3. The function reportAppOpenToComg is responsible for sending information described in the flow to the server and should be called from within applicationWillEnterForeground as below so that it runs in the background:

```
- (void)applicationWillEnterForeground:(UIApplication *)application {
    [self
performSelectorInBackground:@selector(reportAppOpenToComg)
withObject:nil];
}
It should also be called from within applicationDidFinishLaunching or
didFinishLaunchingWithOptions (depending on how you have chosen to
start their app) :
-(BOOL)application:(UIApplication *)application
didFinishLaunchingWithOptions:(NSDictionary *)launchOptions
{
    [self
performSelectorInBackground:@selector(reportAppOpenToComg)
withObject:nil];
.....
```

4. Finally register the url identifier for your app given to you by Comg in your application plist under the key 'URL types' such that you have added the URL identifier and URL scheme as shown below:

| Key | Type | Value |
| --- | --- | --- |
| Localization native development region | String | English |
| Bundle display name | String | Equine Drugs |
| Executable file | String | ${EXECUTABLE_NAME} |
| Icon file | String | |
| Bundle identifier | String | com.mycompany.myapp |
| InfoDictionary version | String | 6.0 |
| Bundle name | String | ${PRODUCT_NAME} |
| Bundle OS Type code | String | APPL |
| Bundle creator OS Type code | String | ???? |
| Bundle version | String | 1.3 |
| Application requires iPhone environment | Boolean | YES |
| Main nib file base name | String | MainWindow |
| URL types | Array | (1 item) |
| Item 0 | Diction . . . | (2 items) |
| URL identifier | String | com.mycompany.myapp |
| URL Schemes | Array | (1 item) |
| Item 0 | String | SomoXXXX |

The process for adding these fields is:

1. Ctrl click on the left hand side under the keys and select Add Row. Then select the key type as URL types.

2. Expand the new row and then expand Item 0 so you see 'URL Identifier' Double click on the right hand side and enter the Bundle identifier of your app.

3. Click on the Plus symbol to add another row within Item 0 and Select URL Schemes.

4. Expand URL Schemes and enter the string URL identifier supplied by Comg (where ctag is used in the example above)

The invention claimed is:

1. A method for tracking download of a software application over the Internet from an application server to a user's mobile device in response to the user's selection on the user's mobile device of an advertisement that advertises the software application, the method comprising:

delivering to the user's mobile device the advertisement that advertises the software application;

in response to the user clicking on the advertisement, establishing a link between a web browser on the user's mobile device and a tracking server;

creating at the tracking server an ID dataset comprising at least one of a unique identifier and identification of the advertisement;

receiving the ID dataset from the tracking server at the user's mobile device over the link;

storing the ID dataset received from the tracking server on the user's mobile device using the web browser on the user's mobile device;

the tracking server further redirecting the web browser on the user's mobile device to the application server;

downloading the software application from the application server to the user's mobile device;

activating the downloaded software application on the user's mobile device;

deactivating the web browser on the user's mobile device;

suspending execution of the downloaded software application on the user's mobile device;

reactivating the web browser on the user's mobile device;

establishing a link between the user's mobile device and the tracking server;

transmitting the ID dataset from the user's mobile device to the tracking server over the link;

correlating at the tracking server the ID dataset received from the user's mobile device with the ID dataset created by the tracking server;

delivering, based on the correlating, a browser-executable code from the tracking server to the user's mobile device; and resuming, using the browser-executable code, the execution of the suspended downloaded software application.

2. The method of claim 1, further comprising storing the ID dataset on the user's mobile device in the form of at least one of a cookie and a client-side database item.

3. The method of claim 1, further comprising:

in response to receiving the browser-executable code from the tracking server, retrieving, using the web browser on the user's mobile device, the ID dataset stored on the user's mobile device;

passing the ID dataset to the suspended downloaded software application; and resuming the execution of the suspended downloaded software application.

4. The method according of claim 1, further comprising storing the ID dataset created by the tracking server on the tracking server.

5. The method of claim 1, further comprising including the advertisement in a webpage.

6. The method of claim 1, further comprising including in the ID dataset at least one of: a date and time of the user's selection of the advertisement, a type of the user's mobile device, identification of the delivery of the advertisement to the user's mobile device, and an IP address used by the user's mobile device when selecting the advertisement.

7. The method of claim 1, further comprising, when the ID dataset includes identification of the delivery of the advertisement to the user's mobile device, including in the identification of the delivery of the advertisement to the user's mobile device at least one of an identity of a webpage or application including the advertisement, an identity of a publisher of the advertisement, and a name of an advertising campaign.

8. A method for tracking download of a software application over the Internet from an application server to a user's mobile device in response to the user's selection on the user's mobile device of an advertisement that advertises the software application, the method comprising:

delivering to the user's mobile device the advertisement that advertises the software application;

in response to the user clicking on the advertisement, the user's mobile device to creating an ID dataset comprising at least one of a unique identifier and identification of the advertisement;

storing the ID dataset on the user's mobile device using a web browser on the user's mobile device;

redirecting the web browser on the user's mobile device to the application server;

downloading the software application from the application server to the user's mobile device;

activating the downloaded software application on the user's mobile device;

deactivating the web browser the user's mobile device;

suspending execution of the downloaded software application on the user's mobile device;

reactivating the web browser on the user's mobile device;

establishing a link between the user's mobile device and the tracking server;

transmitting the ID dataset from the user's mobile device to the tracking server;

delivering a browser-executable code from the tracking server to the user's mobile device; and resuming, using the browser-executable code and the web browser on the user's mobile device, execution of the suspended downloaded software application.

9. The method of claim 8, further comprising including in the ID dataset at least one of: a unique hardware device identifier of the user's mobile device, an identifier of the downloaded software application, or a combination of the two; a date and time of the user's selection of the advertisement; a type of the user's mobile device; identification of the delivery of the advertisement to the user's mobile device; and an IP address used by the user's mobile device when the user selects the advertisement.

10. A non-transitory computer readable medium storing a computer program executable by a processor, the computer program comprising executable program code which causes a user's mobile device and a tracking server to execute a method of tracking download of a software application over the Internet from an application server to the user's mobile device in response to the user's selection on the user's mobile device of an advertisement that advertises the software application, the method comprising:

delivering to the user's mobile device a clickable advertisement that advertises the software application;

in response to the user clicking on the advertisement establishing a link between a web browser on the user's mobile device and a tracking server;

creating at the tracking server an ID dataset comprising at least one of a unique identifier and identification of the advertisement;

receiving the ID dataset from the tracking server at the user's mobile device over the link;

storing the ID dataset received from the tracking server on the user's mobile device using the web browser on the user's mobile device, the tracking server further redirecting the web browser on the user's mobile device to the application server;

downloading the software application from the application server to the user's mobile device;

activating the downloaded software application on the user's mobile device;

deactivating the web browser on the user's mobile device;

suspending execution of the downloaded software application on the user's mobile device; and reactivating the web browser on the user's mobile device;

establishing a link between the user's mobile device and the tracking server;

transmitting the ID dataset from the user's mobile device to the tracking server over the link; and delivering a browser-executable code from the tracking server to the user's mobile device; and resuming, using the browser-executable code and the web browser on the user's mobile device, execution of the suspended downloaded software application.

11. A method for tracking download of a software application over the Internet from an application server to a user's mobile device in response to the user's selection on the user's mobile device of an advertisement that advertises the software application, the method comprising:

delivering to the user's mobile device the advertisement that advertises the software application;

in response to the user clicking on the advertisement establishing a link between a web browser on the user s mobile device and a tracking server;

creating at the tracking server a data set comprising at least one of a unique identifier and identification of the advertisement;

storing the data set on the tracking server;

transmitting the unique identifier or identification of the advertisement from the tracking server to the user's mobile device over the link;

storing the unique identifier or identification of the advertisement on the user's mobile device using the web browser on the user's mobile device;

the tracking server further redirecting the web browser on the user's mobile device to the application server;

downloading the software application from the application server to the user's mobile device;

activating the software application on the user's mobile device;

deactivating the web browser on the user's mobile device;

suspending execution of the downloaded software application on the user's mobile device;

reactivating the web browser on the user's mobile device;

establishing a link between the user's mobile device and the tracking server;

the tracking server further creating a browser-executable code;

transmitting the browser-executable code from the tracking server to the user's mobile device;

executing the browser-executable code on the user's mobile device using the web browser on the user's mobile device;

retrieving using the web browser on the user's mobile device the data set stored by the web browser on the user's mobile device;

resuming the execution of the suspended downloaded software application;

passing the retrieved data set to the software application; and transmitting the retrieved data set to the tracking server.

12. The method of claim 11 further comprising storing the unique identifier or identification of the advertisement on the user's mobile device in the form of at least one of a cookie and a client-side database item.

13. The method of claim 11 further comprising including the advertisement in a webpage.

14. The method of claim 11 further comprising including in the data set at least one of: a date and time of the user's selection of the advertisement, a type of the user's mobile device, identification of the delivery of the advertisement to the user's mobile device, and an IP address used by the user's mobile device when selecting the advertisement.

15. The method of claim 14, further comprising, when the data set include the identification of the delivery of the advertisement to the user's mobile device, including in the data set at least one of an identity of a webpage or application including the advertisement, an identity of a publisher of the advertisement, and a name of the advertising campaign.

* * * * *